US008102638B2

(12) United States Patent
Arslan et al.

(10) Patent No.: US 8,102,638 B2
(45) Date of Patent: Jan. 24, 2012

(54) MICRO ELECTROMECHANICAL CAPACITIVE SWITCH

(75) Inventors: Tughrul Arslan, Edinburgh (GB); Anthony J. Walton, Edinburgh (GB); Nakul R. Haridas, Edinburgh (GB)

(73) Assignee: The University Court of the University of Edinburgh, Edinburgh (GB)

( * ) Notice: Subject to any disclaimer, the term of this patent is extended or adjusted under 35 U.S.C. 154(b) by 833 days.

(21) Appl. No.: 12/157,828

(22) Filed: Jun. 13, 2008

(65) Prior Publication Data

US 2009/0067115 A1 Mar. 12, 2009

Related U.S. Application Data

(60) Provisional application No. 60/934,401, filed on Jun. 13, 2007.

(51) Int. Cl.
*H01G 7/00* (2006.01)

(52) U.S. Cl. ..... 361/281; 361/277; 361/278; 361/283.1; 361/283.3; 361/290

(58) Field of Classification Search .................. 361/281, 361/272–273, 277–279, 283.1, 283.3, 290–292
See application file for complete search history.

(56) References Cited

U.S. PATENT DOCUMENTS

| | | | | |
|---|---|---|---|---|
| 6,469,677 | B1 | 10/2002 | Schaffner et al. | |
| 6,529,093 | B2 * | 3/2003 | Ma | 333/101 |
| 6,771,158 | B2 * | 8/2004 | Lee et al. | 337/36 |
| 6,788,175 | B1 * | 9/2004 | Prophet | 335/78 |
| 6,917,086 | B2 * | 7/2005 | Cunningham et al. | 257/415 |
| 7,033,910 | B2 * | 4/2006 | Faris | 438/455 |
| 7,141,989 | B1 * | 11/2006 | Liu | 324/661 |
| 7,151,425 | B2 * | 12/2006 | Park et al. | 333/262 |
| 7,257,307 | B2 * | 8/2007 | Kim et al. | 385/147 |
| 7,742,275 | B2 * | 6/2010 | Liu | 361/277 |
| 2004/0252059 | A1 | 12/2004 | Zaghloul et al. | |
| 2005/0062653 | A1 | 3/2005 | Cetiner et al. | |

FOREIGN PATENT DOCUMENTS

| | | |
|---|---|---|
| EP | 1944829 | 7/2008 |
| WO | 2005034287 | 4/2005 |
| WO | 2007091988 | 8/2007 |

OTHER PUBLICATIONS

International Search Report in PCT/GB2008/050448 dated Aug. 27, 2008.
Written Opinion in PCT/GB2008/050448 dated Aug. 27, 2008.
Chen, et al, "Folded Dual-band (2.4/5.2GHz) Antenna Fabricated on Silicon Suspended Parylene Membrane"; Microwave Conference Proceedings, 2005. APMC 2005. Asia-Pacific Conference Proceedings Publication /date Dec. 4-7, 2005.

* cited by examiner

*Primary Examiner* — Nguyen T Ha
(74) *Attorney, Agent, or Firm* — Edwards Wildman Palmer LLP; Scott D. Wofsy; George N. Chaclas

(57) ABSTRACT

A capacitive switch for microelectromechanical systems (MEMS) comprises a topmost metal plate which extends across a bridge structure formed by a polymer layer. The polymer layer comprises poly-monochoro-para-xylene (parylene-C). The space below the polymer layer contains the second plate on a substrate. Using parylene as the primary bridge material makes the bridge of the MEMS device very flexible and requires a relatively low actuation voltage to pull the bridge down and lower power is required to control the MEMS device.

23 Claims, 4 Drawing Sheets

63 65 69 67

MICRO ELECTROMECHANICAL CAPACITIVE SWITCH

CROSS-REFERENCE TO RELATED APPLICATION

This application claims priority to U.S. Provisional Patent Application No. 60/934,401 filed Jun. 13, 2007, which is incorporated herein by reference.

FIELD OF THE INVENTION

The present invention relates to micro electromechanical systems (MEMS) capacitive switches.

BACKGROUND TO THE INVENTION

Micro-electro Mechanical Systems (MEMS) switches are devices that use mechanical movement to achieve a short circuit or an open circuit in the RF transmissions line. RF MEMS switches are specific micromechanical switches that are designed to operate at RF-to-millimetre-wave frequencies (0.1 to 100 GHz) and form the basic building blocks in the RF communication system. The forces required for the mechanical movement can be obtained, for example, but not exclusively using electrostatic, magneto static, piezoelectric, or thermal designs.

The advantages of MEMS switches over p-i-n-diode or FET switches are:

- Near-Zero Power Consumption: Electrostatic actuation does not consume any current, leading to very low power dissipation (10-100 nJ per switching cycle).
- Very High Isolation: RF MEMS series switches are fabricated with air gaps, and therefore, have very low off-state capacitances (2-4 fF) resulting in excellent isolation at 0.1-40 GHz.
- Very Low Insertion Loss: RF MEMS series and shunt switches have an insertion loss of −0.1 dB up to 40 GHz.
- Intermodulation Products: MEMS switches are very linear devices and, therefore, result in very low intermodulation products. Their performance is around 30 dB better than p-i-n or FET switches.
- Very Low Cost: RF MEMS switches are fabricated using surface (or bulk) micromachining techniques and can be built on quartz, Pyrex; low temperature cofired ceramic (LTCC), mechanical-grade high-resistivity silicon, or GaAs substrates.

MEMS switched can be categorised as follows:

- RF circuit configuration—series or parallel.
- Mechanical structure—Cantilever or Air-bridge.
- Form of Contact—Capacitive (metal-insulator-metal) Resistive (metal-metal).

FIGS. 1 and 2 show a typical MEMS capacitive switch 63 which consists of a thin metallic bridge 65 suspended over the transmission line 67 covered by dielectric film 69. The MEMS capacitive switch can be integrated in a coplanar waveguide (CPW) or in a Microstrip topology. Conventional capacitive switches have a layer of dielectric between the two metal layers (bridge and t-line).

In a CPW configuration, the anchors of the MEMS switch are connected to the CPW ground planes. As seen in FIG. 2, when a DC voltage is applied between the MEMS bridge and the microwave line there is an electrostatic (or other) force that causes the MEMS Bridge to deform on the dielectric layer, increasing the bridge capacitance by a factor of 30-100. This capacitance connects the t-line to the ground and acts a short circuit at microwave frequencies, resulting in a reflective switch. When the bias voltage is removed, the MEMS switch returns to its original position due to the restoring spring forces of the bridge.

RF MEMS switches are used in reconfigurable networks, antennas and subsystems because they have very low insertion loss and high Q up to 120 GHz. In addition, they can be integrated on low dielectric-constant substrates used in high performance tuneable filters, high efficiency antennas, and low loss matching networks.

RF MEMS switches offer very low loss switching and can be controlled using 10- to 120 kΩ resistive lines. This means that the bias network for RF MEMS switches will not interfere and degrade antenna radiation patterns. The Bias network will not consume any power and this is important for large antenna arrays.

Typical MEMS switches require typical pull down voltages of 10-60V (these can be significantly lower or higher depending on the exact configuration and material system). This is a large range to cover using a software controlled DC MEMS Switch.

It is an object of the present invention to provide an improved MEMS switch.

SUMMARY OF THE INVENTION

In accordance with a first aspect of the invention there is provided a micro-electromechanical (MEMS) capacitive device comprising: a substrate; a first conducting layer; a material attached to the substrate and forming a bridge structure on the substrate; and a second conducting layer attached to the surface of the material remote from the substrate, wherein the material acts as a mechanical support to the second conducting layer and as a dielectric.

Preferably, the material is adapted to bend in response to the application of a force thereby changing the capacitance of the device, the material is adapted to bend in response to the application of a voltage across the first and second conducting layers thereby changing the capacitance of the device. The material may have a Young's Modulus of elasticity of less than 4.5 GPa. Preferably, the material has a dielectric constant at 1 MHz of more than 2 and is a polymer. The material may be derived from para-xylylene. More preferably, the material is poly-monochoro-para-xylylene. Optionally, the material is poly-para-xylylene.

Preferably, the second conducting layer is a metal. More preferably, the second conducting layer comprises Aluminum. The device may further comprises a co-planar waveguide mounted on the substrate. Optionally, the device is integrated in a microstrip topology.

Preferably, the bridge structure comprises a beam shaped to alter the mechanical properties of the bridge and the way in which it moves in response to the applied voltage. Preferably, the beam is symmetrical. Optionally, the beam is asymmetrical. Preferably, the beam comprises a serpentine flexure. The asymmetric serpentine flexures of the beam under stress would tend to tilt and rotate unlike a symmetric beam structure. Depending upon the shape of the beam, it may twist or bend in a predetermined manner upon application of a voltage.

The device may be used as a switch, phase shifter or matching circuit. Preferably, the device is used to connect and disconnect an electromagnetic device to a feed line or signal path. Preferably, the device is used to alter the phase of the signal on the feed line. Preferably, the change in the phase with the applied voltage is substantially linear over a predetermined voltage range. Preferably, a plurality of the devices can be combined to provide a controllable phase shift from 0 to 360° upon application of the applied voltage. Preferably, the device is used to match the impedance of the electromagnetic device to the signal at specific frequencies of its operation.

It should be appreciated that the present invention can be implemented and utilized in numerous ways, including without limitation as a process, an apparatus, a system, a device, and a method for applications now known and later developed. These and other unique features of the system disclosed herein will become more readily apparent from the following description and the accompanying drawings.

BRIEF DESCRIPTION OF THE DRAWINGS

The invention will now be described by way of example only with reference to the accompanying drawings of which.

DETAILED DESCRIPTION OF THE DRAWINGS

The present invention overcomes many of the prior art problems. The advantages, and other features of the systems and methods disclosed herein, will become more readily apparent to those having ordinary skill in the art from the following detailed description of certain preferred embodiments taken in conjunction with the drawings which set forth representative embodiments of the present invention.

Figure 3:
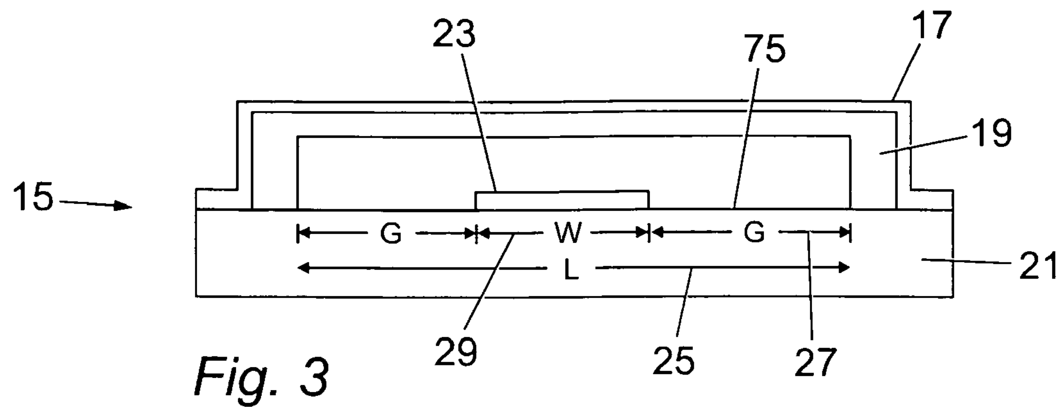
FIG. 3 shows a preferred embodiment of a device in accordance with the present invention.

FIG. 3 shows the preferred embodiment of a device in accordance with the present invention. The device 15 comprises a topmost metal layer 17 which extends across a bridge structure formed by a polymer layer 19. The polymer layer comprises poly-monochoro-para-xylene (parylene-C).

The space below the polymer layer 19 contains a co-planar waveguide 23 and the second plate 75 on substrate 21. The overall supported distance L is provided by the distance W being the width of the coplanar wave guide and distances G which are equal and provide the remaining distance between the edges of the coplanar waveguide and the upright part of the polymer 19.

Parylene is generally used as a water proofing material in MEMS fabrication. It is a plastic like polymer with very low spring constant (i.e. high elasticity). Parylene-C was used in the preferred embodiment of the present invention because it contained the appropriate degree of flexibility, dielectric strength and other properties associated with its normal use as a coating material. Parylene-C is a vacuum deposited plastic film that forms a polymer as a solid coating from a gaseous monomer. It provides excellent corrosion resistance, is light weight, stress free and radiation resistant making it suitable for space and military applications. Parylene-C has a Young's modulus of 2.8 GPa and is therefore an extremely flexible material that is able to bend with the deformation of the device upon application of a voltage.

Using Parylene as the primary bridge material makes the bridge of the MEMS device very flexible and requires a relatively low actuation voltage to pull the bridge down. This means that lower power is required to control the MEMS device. The use of Parylene allows the creation of a single element, dynamically configurable rf phase shifter for any particular calibrated frequency. An array of such phase shifter elements can be assembled and individually addressed, to vary the overall properties of an rf device. For example by attaching antenna elements to form a phased array either for operation at a fixed, or a reconfigurable range of frequencies.

Figure 1:
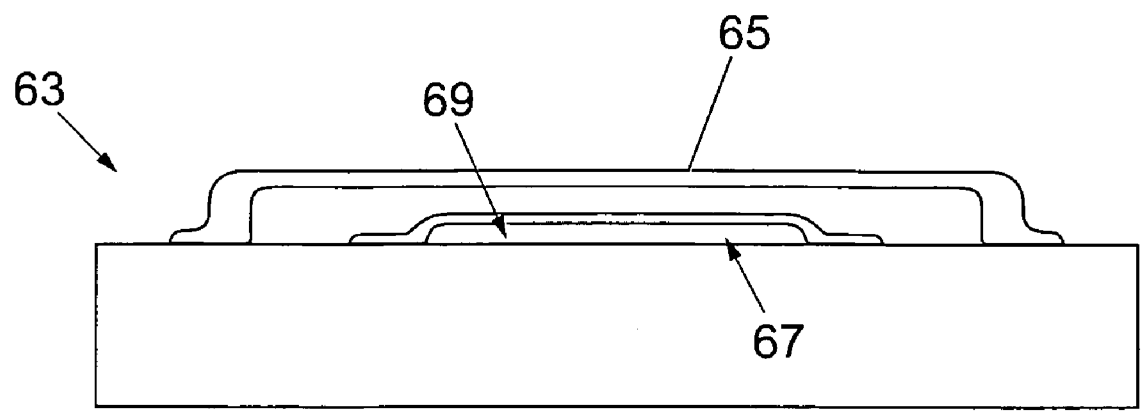
FIG. 1 is a diagram of a known MEMS capacitive bridge.
Figure 2:
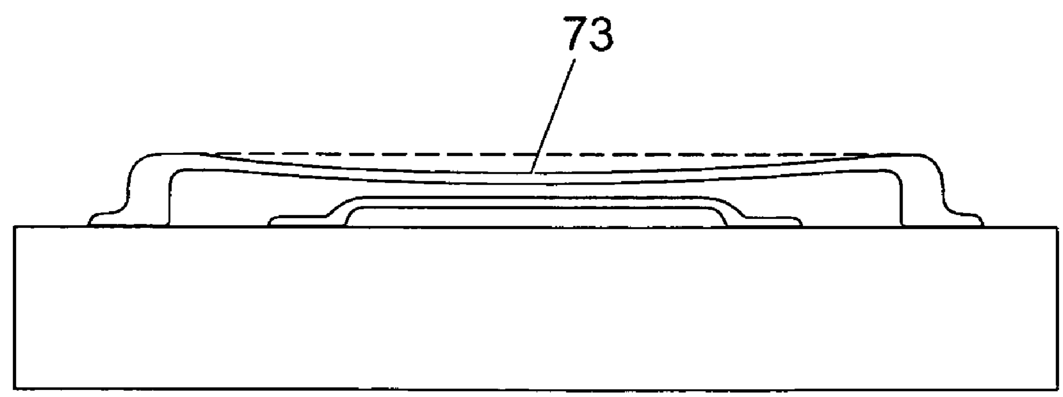
FIG. 2 is a diagram of a known MEMS capacitive bridge having a voltage applied thereto.

The use of Parylene provides the strength member of the bridge. Traditional MEMS bridges use a metal bridge and have an insulating layer on the bottom plate to provide the dielectric for the capacitive switch, shown in FIG. 1. Compared to the typical MEMS bridge, in the preferred embodiment of the present invention the insulation layer is moved from the bottom plate to the top plate. This provides an insulating layer between the two metal layers of the MEMS device and eliminates the need for the insulation over the metal track below. The preferred embodiment uses air as the variable dielectric and parylene as constant dielectric material, to change the capacitance by varying the bridge height. Choosing parylene as the primary material of the bridge also supports having very thin metal films as the top metal layer. This facilitates the fabrication of very flexible MEMS devices.

Figure 4:
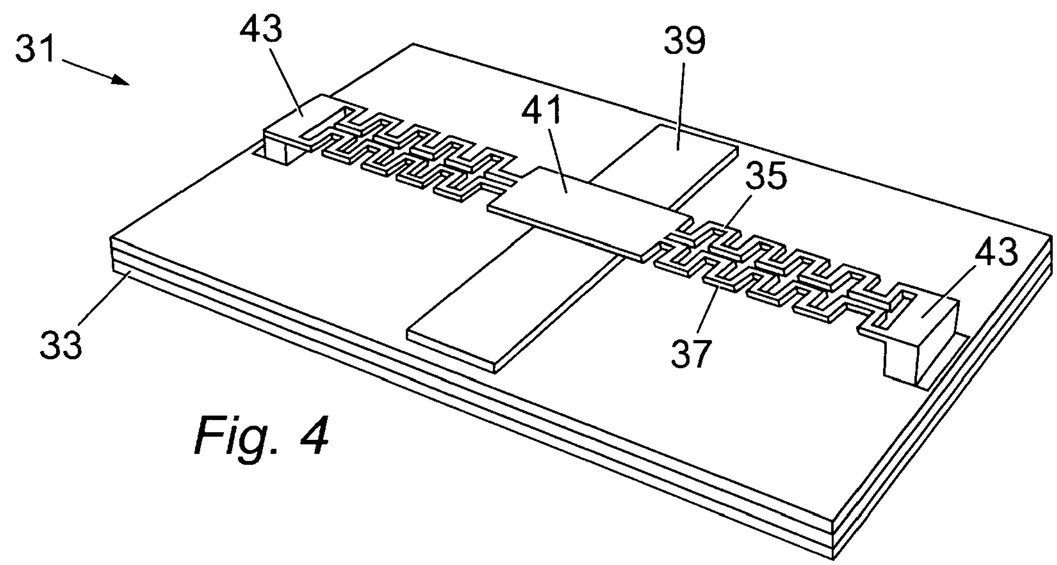
FIG. 4 shows a second embodiment of the device having a symmetrical serpentine support.

FIG. 4 shows a symmetric serpentine bridge design 31 comprising a substrate 33, serpentine flexures 35, 37 which extend along the length of the substrate to substantially bisect it. The serpentine flexures are supported in a raised position by supports 43. Solid plate 41 forms the central part of the beam and is attached to the serpentine flexures 35, 37 at either end thereof. CPW 39 is supported below plate 41 and is separated from the plate 41 by a gap.

Figure 5:
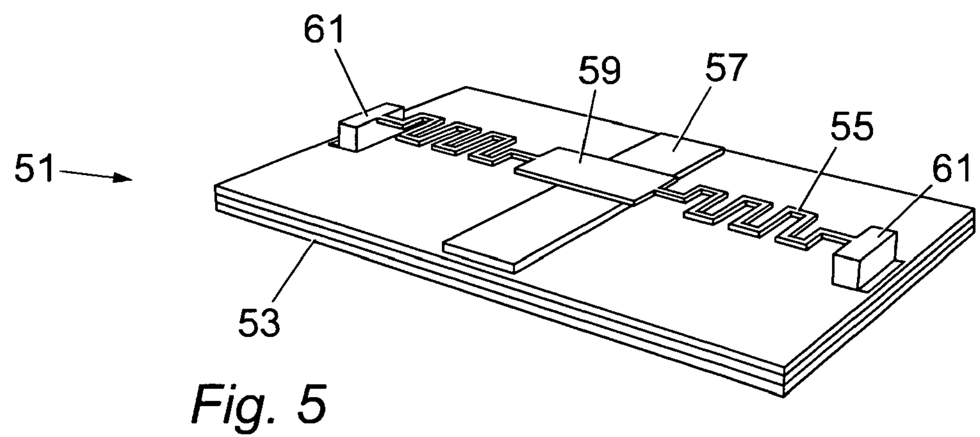
FIG. 5 shows a device similar to that of FIG. 4 but having an asymmetrical serpentine support.

FIG. 5 shows another embodiment of a switch of similar construction to that of FIG. 4. It comprises a substrate 53, a serpentine beam 55, a CPW 57, a plate 59 and supports 61. The asymmetric structure can cause the bridge to twist upon application of a voltage. Other beam and flexure geometries are envisaged where the application of a voltage could move the beam in a controllable manner.

Figure 6:
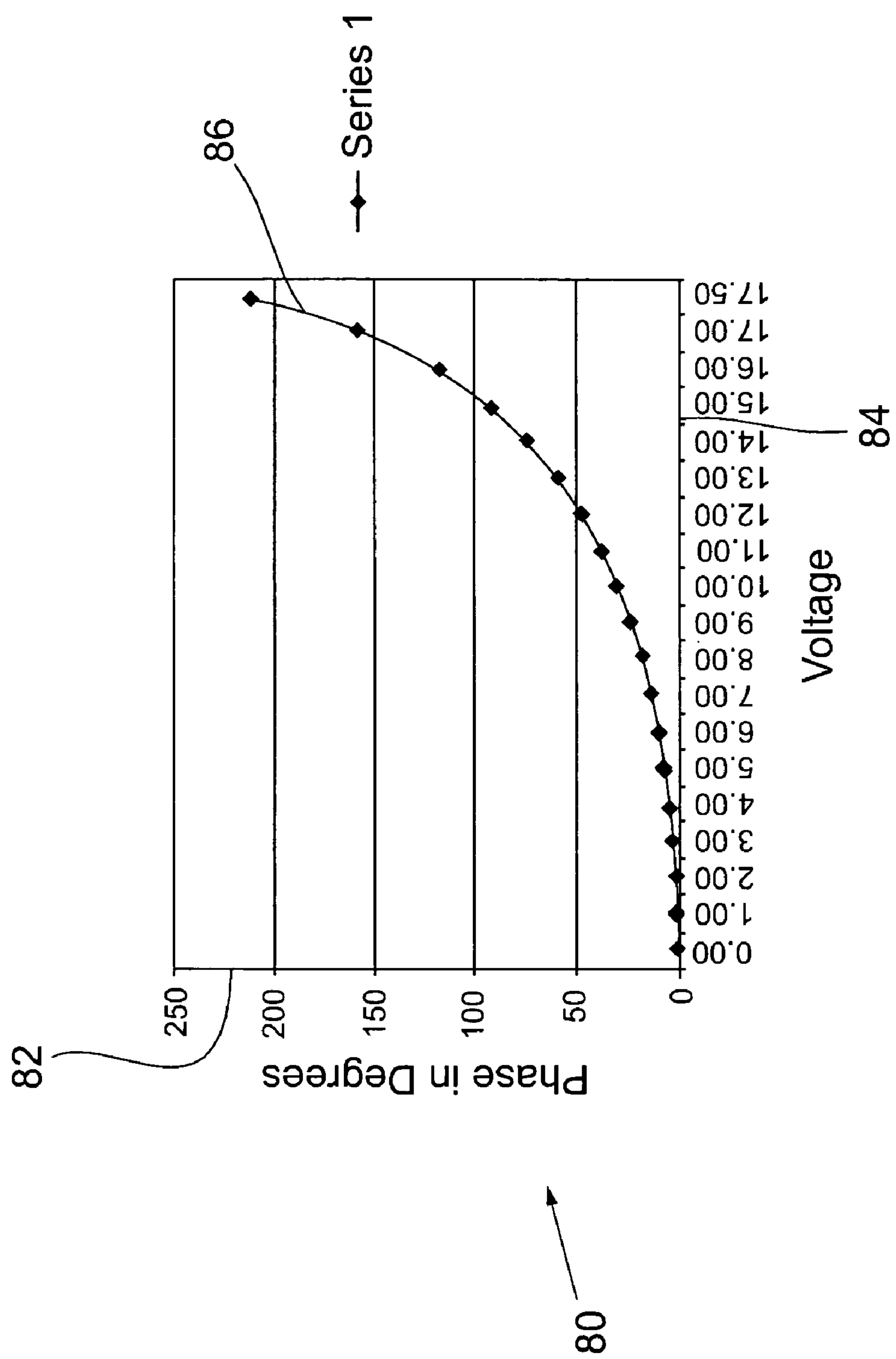
FIG. 6 is a graph which plots the phase against applied voltage for a device in accordance with the invention.

FIG. 6 is a graph 80 of phase 82 against applied voltage 84 for a device in accordance with the present invention. The curve 86 shows that the phase change is exponential in nature and controllable. In addition, at lower voltages the curve is approximately linear. In a preferred embodiment of the present invention, a phase shifter control is implemented using 5 such devices. In that case the cumulative effect allows a phase shift of up to 360° to be achieved with an applied voltage of between 0 V and 14 V.

Figure 7:
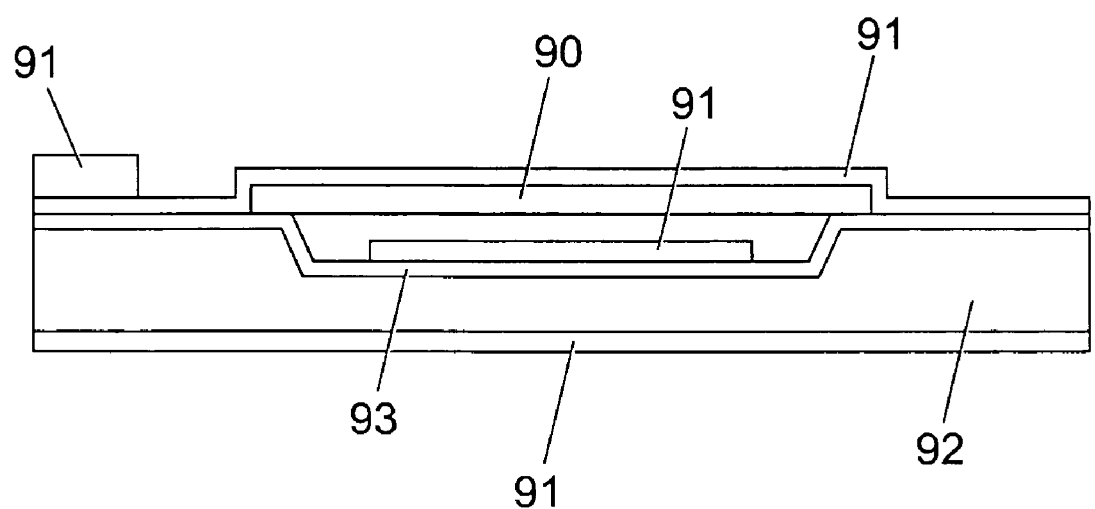
FIG. 7 shows a second embodiment of a device in accordance with the present invention.

FIG. 7 shows the cross section of a second embodiment of the MEMS device with Parylene 90, metal 91, silicon 92, and insulation 93. We believe that this arrangement for making a capacitive MEMS switch structure is novel, and has never been mentioned in any patent. Parylene is used as the primary material and mechanical structural element for the bridge, whilst a very thin layer of metal is used to provide the electrical property of the bridge.

The above device of the present invention provides a low power, low voltage actuated MEMS switch that changes the phase of a signal on a transmission line. Its use can be extended into a distributed MEMS transmission line (DTML) where each unit can be electrically controlled.

Improvements and modifications may be incorporated herein without deviating from the scope of the claims.

The invention claimed is:

1. A micro-electromechanical (MEMS) capacitive device comprising:

a substrate;
a first conducting layer;
a material attached to the substrate and forming a bridge structure on the substrate; and
a second conducting layer attached to the surface of the material remote from the substrate,
wherein the material acts as a mechanical support to the second conducting layer and as a dielectric, and wherein the device is operable to alter the phase of a signal on a feed line or signal path.

2. The device of claim 1 wherein the material is adapted to bend in response to the application of a force thereby changing a capacitance of the device.

3. The device of claim 1 wherein the material is adapted to bend in response to the application of a voltage across the first and second conducting layers thereby changing a capacitance of the device.

4. The device of claim 3 wherein the bridge structure comprises a beam shaped to alter mechanical properties of the bridge and a way in which the bridge structure moves in response to an applied voltage.

5. The device of claim 4 wherein the beam is symmetrical.

6. The device of claim 4 wherein the beam is asymmetrical.

7. The device of claim 4 wherein the beam comprises a serpentine flexure.

8. The device of claim 4 wherein the shape of the beam is configured such that the beam twists or bends in a predetermined manner upon the application of the applied voltage.

9. The device of claim 8 wherein the device is operable to match the impedance of the electromagnetic device to the signal at specific frequencies of respective operation.

10. The device of claim 4 wherein the device is used to connect and disconnect an electromagnetic device to a feed line or signal path.

11. The device of claim 1 wherein the material has a Young's Modulus of elasticity of less than 4.5 GPa.

12. The device of claim 1 wherein the material has a dielectric constant at 1 MHz of more than 2.

13. The device of claim 1 wherein the material is a polymer.

14. The device of claim 1 wherein the material is derived from para-xylylene.

15. The device of claim 1 wherein the material is poly-monochoro-para-xylylene.

16. The device of claim 1 wherein the material is poly-para-xylylene.

17. The device of claim 1 wherein the second conducting layer is a metal.

18. The device of claim 1 wherein the second conducting layer comprises aluminum.

19. The device of claim 1 wherein the device further comprises a co-planar waveguide mounted on the substrate.

20. The device of claim 1 wherein the device is integrated in a microstrip topology.

21. The device of claim 1 wherein the change in the phase with the applied voltage is substantially linear over a predetermined voltage range.

22. A phase shifter comprising a plurality of the devices of claim 1 combined to provide a controllable phase shift from 0 to 360° upon application of the applied voltage.

23. The device of claim 1, wherein the first conducting layer is mounted in a cavity in the substrate.

* * * * *